US010027817B2

(12) United States Patent
Midtun et al.

(10) Patent No.: US 10,027,817 B2
(45) Date of Patent: Jul. 17, 2018

(54) DESKTOP MOBILE INFORMATION PROVIDER

(71) Applicant: Mitel Networks Corporation, Ottawa (CA)

(72) Inventors: James Dean Midtun, Chandler, AZ (US); Arthur Louis Gaetano, Jr., Chandler, AZ (US)

(73) Assignee: Mitel Networks Corporation, Ottawa, Ontario (CA)

( * ) Notice: Subject to any disclaimer, the term of this patent is extended or adjusted under 35 U.S.C. 154(b) by 0 days.

(21) Appl. No.: 14/486,971

(22) Filed: Sep. 15, 2014

(65) Prior Publication Data
US 2015/0004951 A1 Jan. 1, 2015

Related U.S. Application Data

(62) Division of application No. 12/658,422, filed on Feb. 8, 2010, now abandoned.

(51) Int. Cl.
H04M 3/42 (2006.01)
H04M 3/54 (2006.01)
H04M 3/537 (2006.01)
H04M 3/53 (2006.01)
H04W 84/16 (2009.01)

(52) U.S. Cl.
CPC ....... H04M 3/546 (2013.01); H04M 3/42314 (2013.01); H04M 3/53 (2013.01); H04M 3/537 (2013.01); H04W 84/16 (2013.01)

(58) Field of Classification Search
CPC ...................................... H04W 4/14
USPC .................................. 455/413, 415, 417
See application file for complete search history.

(56) References Cited

U.S. PATENT DOCUMENTS

| 5,841,854 | A | 11/1998 | Schumacher et al. |
| 6,535,595 | B1* | 3/2003 | Nakamura ............. 379/164 |
| 6,671,366 | B1* | 12/2003 | Isotalo ............. 379/221.08 |
| 6,748,071 | B2* | 6/2004 | Milton ............. H04M 3/42314 379/201.12 |
| 6,823,197 | B1 | 11/2004 | Chen et al. |
| 6,993,360 | B2* | 1/2006 | Plahte ............. H04M 1/72519 455/554.1 |
| 7,359,720 | B2* | 4/2008 | Hartmaier ......... H04M 3/42127 455/414.3 |
| 8,064,951 | B2* | 11/2011 | Woodson et al. ......... 455/555 |

(Continued)

Primary Examiner — Amancio Gonzalez

(57) ABSTRACT

A system, method, and desktop mobile information provider for unifying mobile devices with provisioned endpoints. In one illustrative embodiment, a user's mobile device can receive a mobile event. The mobile device can then transmit the mobile event to either a private branch exchange directly or through a unified communications server. The mobile event can then be displayed to the user's private branch exchange provisioned endpoint, and in one embodiment, the provisioned endpoint being a private branch exchange desk phone. The mobile event can be displayed to the provisioned endpoint using text, light emitting diodes for message waiting indicators, audible tones, or graphics if the desk phone supports it. The provisioned endpoint can provide a response mechanism when a mobile event is received. Often, the mobile event can be a live call whereby the user at their provisioned endpoint can respond to the call without the use of the mobile device.

14 Claims, 6 Drawing Sheets

(56) References Cited

U.S. PATENT DOCUMENTS

| | | | | |
|---|---|---|---|---|
| 8,537,854 B2* | 9/2013 | Bae | ............... | H04L 12/6418 370/352 |
| 9,078,115 B2* | 7/2015 | Shmunis | ............ | H04M 1/04 |
| 2002/0055975 A1 | 5/2002 | Petrovykh | | |
| 2007/0202884 A1* | 8/2007 | Nykanen et al. | ............ | 455/455 |
| 2007/0275745 A1* | 11/2007 | Owen | ............ | 455/502 |
| 2009/0054091 A1 | 2/2009 | van Wijk et al. | | |

* cited by examiner

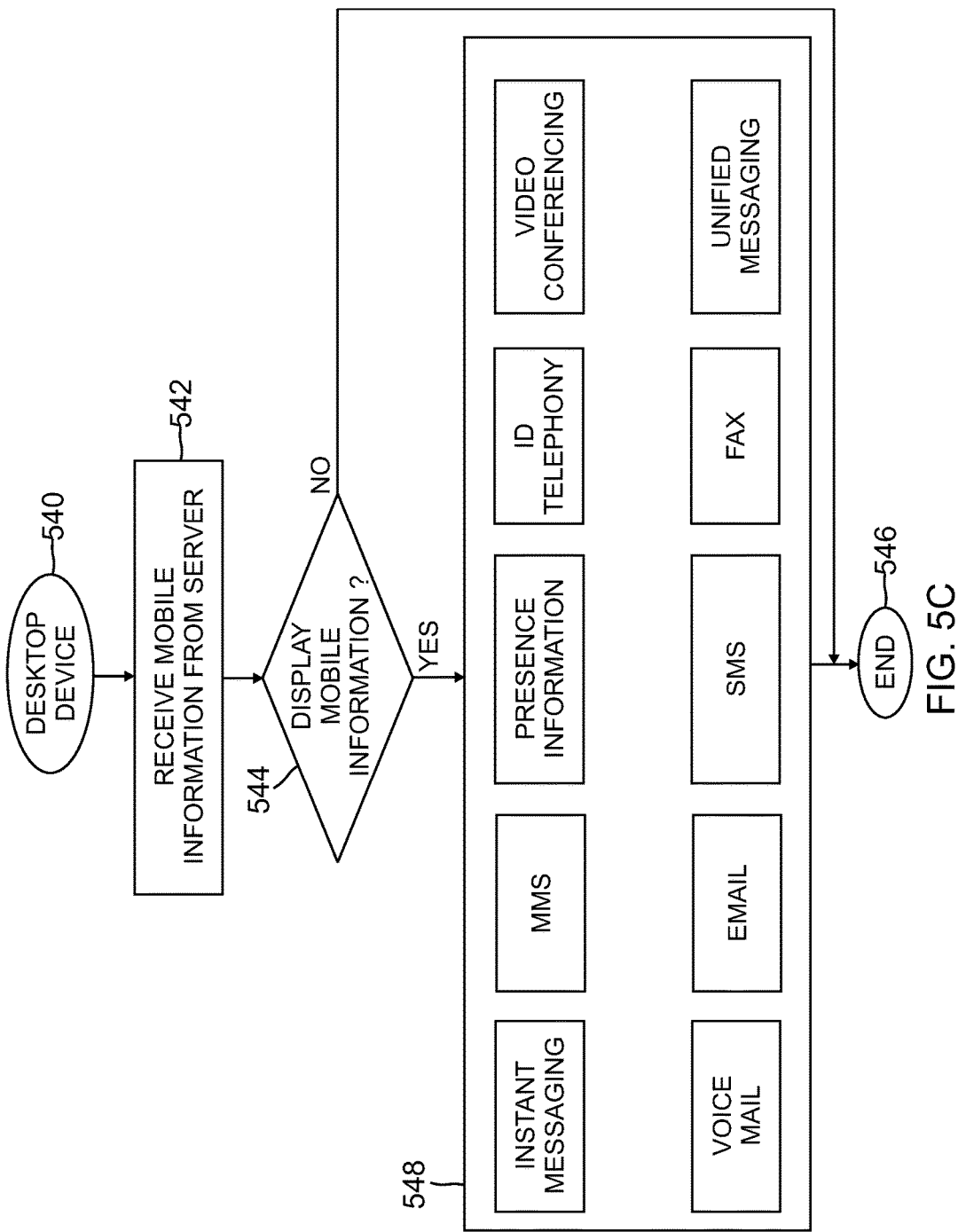

DESKTOP MOBILE INFORMATION PROVIDER

TECHNICAL FIELD

This application generally relates to mobile devices, and more particularly, to a system and method for unifying mobile device information with PBX provisioned endpoints.

BACKGROUND

Private branch exchange (PBX) telecommunication systems can enable corporate employees within an organization to place calls to each other without going through a public telephone network. Traditional systems can incorporate a switchboard and associated equipment, usually located on the customer's premises. The PBX equipment can provide for switching calls between any two extensions served by the exchange or between any extension and the national telephone system. PBX equipment is well known in the art, as numerous manufacturers have provided many types of PBX systems for virtually every type of business environment.

As mobile devices have proliferated, and cell phones have become relatively mainstream, corporate employees often will simultaneously be associated with multiple communication devices. "Call-forwarding" features provided by most PBX manufacturers can be used to route calls from desktop devices to cell phones. When away from the office, the employee can program the PBX to forward all incoming calls to their cell phone. This approach allows for incoming calls to get re-routed to their cell phones, and in some applications when the worker answers the cell phone, the call can be completed.

Nonetheless, this approach wholly neglects events driven or originated by the mobile device. Typical PBX applications do not recognize such mobile events. Situations where employees leave or forget their mobile phones are not accounted for. In addition thereto, several conditions can arise whereby it is neither convenient nor practical for a user to reach their mobile device. Simply put, what is lacking in the previous approaches is the functionality of viewing a user's mobile alerts, messages, indications, etc. on a PBX endpoint. Typically, employees within an office environment need the ability to see information arriving on their mobile device as well as their endpoint device.

Previously, the employees would have to make sure that they had their mobile device in a location viewable while working at their desk. Any messages or alerts targeted at the mobile device would have to be viewed and responded to using the mobile device. Those implementations focused on pushing information from the desktop or PBX system down to the mobile device. The focus was not on creating a unified view to the user's PBX provisioned endpoints. A need therefore exists to provide a desktop mobile information provider that provides a unified system and method in addition to overcoming the above-described limitations.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness.

The application itself, however, as well as a preferred mode of use, further objectives and advantages thereof, will be best understood by reference to the following detailed description of illustrative embodiments when read in conjunction with the accompanying drawings, wherein:

FIG. 5C is a flow chart illustrating routines performed by a desktop device in accordance with one aspect of the present application.

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Generally described, the present application relates to unifying mobile devices with devices, and more particularly, to a system and method for forwarding mobile messages, alerts and indications to private branch exchange (PBX) provisioned endpoints. In one illustrative embodiment, a user's mobile device can receive a mobile event. Mobile events can include, but are not limited to, missed calls, short message services (SMS) messages, multimedia messaging service (MMS) messages, voicemails, and other mobile specific indications. The mobile device can then transmit the mobile event to either a PBX directly or through a unified communications (UC) server. Afterwards, the mobile event can be displayed to the user's PBX provisioned endpoint. The mobile event can be displayed on the provisioned endpoint using text, light emitting diodes for message waiting indicators, audible tones, or graphics if the desk phone supports it.

In another or related embodiment, the provisioned endpoint can provide a response mechanism when a mobile event is received. Often, the mobile event can be a live call whereby the employee at their provisioned endpoint can respond to the call without the use of their mobile device. Through this, airtime charges can be saved. Furthermore, returning missed, dialed, or received calls using their provisioned endpoint can be used instead of the mobile device.

The illustrations provided above were for exemplary purposes and should not be construed as limiting the scope of the present application. Additional features and embodiments will be provided below to discuss various implementations of the desktop mobile information provider system and method described herein.

Figure 1:
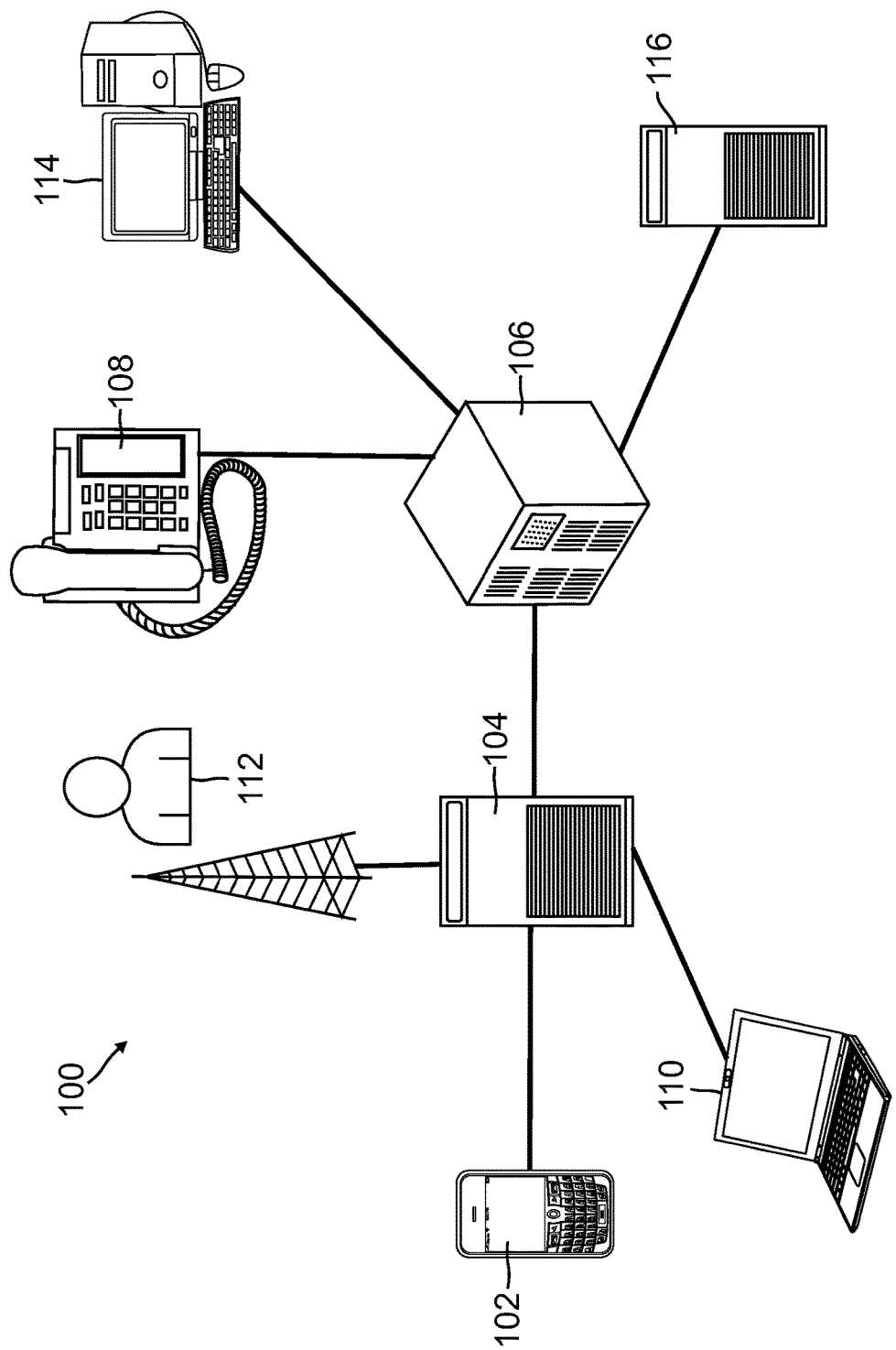
FIG. 1 depicts an exemplary block diagram for communicating messages from a mobile device to an endpoint in accordance with one aspect of the present application.

With reference now to FIG. 1, an exemplary block diagram for communicating messages from a mobile device 102 to a desktop device 108 or other provisioned endpoint in accordance with one aspect of the present application is provided. As shown, a typical system 100 can include a mobile device 102, UC server 104, PBX 106, and a desktop device 108 configuration. As will be described, the configuration is not necessarily limited to those illustrated features, but instead can include fewer or more components which will become apparent to those skilled in the relevant art. Generally, the present application can be used in industries where PBX provisioned devices 108 and mobile devices 102 are used.

In accordance with the exemplary system 100, the mobile device 102 can provide mobile events to the desktop device 108. Mobile devices 102 can include cell phones, handheld devices, smart phones, laptops, or any other type of device that can be portable and provide mobile information. Typically, the mobile device 102 can include a display. The display can incorporate touch screen features known to those skilled in the relevant art. In some devices 102, such as Apple's iPhone® or Google's Nexus One®, a keyboard can be directly placed on the display. In other mobile devices 102, the keyboard can be provided entirely separate from the display. Separating keyboards from the display has become very popular and is provided in such devices as Palm's Treo® or RIM's Blackberry®.

Each mobile device 102 can provide a wide variety of applications. These applications can allow a user to better manage their personal and work lives. Included within most mobile devices 102 are word processing, accounting, and calendar applications. Mobile devices 102 can also include a camera, portable media player, and messaging capabilities. These and additional features will become apparent from the discussion provided below.

Associated with mobile devices 102 can be mobile carrier networks. Mobile carrier networks can also be referred to as mobile network operators, carrier service provider, wireless service provider, wireless carrier, cellular phone company, etc. The mobile carrier networks can provide numerous services to the mobile phones 102, which will be described below.

In typical operations of the system 100, a mobile device 102 can receive mobile events. The mobile device 102 can then forward or push that event to the UC server 104, as depicted in FIG. 1. Normally, the mobile device 102 can process the mobile event and then provide the UC server 104 with mobile information.

After receiving the mobile information, the UC server 104 can provide real-time communication services. These services can include, but are not limited to, instant messaging, presence information, IP telephony, video conferencing, call control, and speech recognition. Often the UC server 104 can also include unified messaging services. Examples of these services can include integrated voicemail, email, short message services, and fax system. The UC server 104 can also provide a series of business applications to simplify and integrate all forms of communications.

Typically, the UC server 104 can be distributed across multiple devices that can provide a consistent unified user interface. Alternatively, the UC server 104 can be provided by a single server as shown in FIG. 1. The UC server 104 can provide services allowing an individual to send a message on one medium and receive on another. For example, one can receive a voice mail message and choose to access it through email or a cell phone.

To communicate efficiently, the mobile device 102 and the UC server 104 can use a common set of rules and signals, also known as a protocol. Generally, the protocol determines the type of error checking to be used; what data compression method, if any, will be used; how the sending device will indicate that it has finished sending a message; and how the receiving device will indicate that it has received a message. Programmers can choose from a variety of standard protocols.

In one embodiment, simple object access protocol (SOAP) can be used for exchanging structured and type information between the mobile device 102 and the UC server 104. Particularly useful for this system is that SOAP has no application on transport semantics making it highly modular and extensible. SOAP can form the foundational layer of the web services protocol stack providing a basic messaging framework upon which abstract layers can be built. SOAP procedures can be used to correctly format data. While SOAP is used in one embodiment, numerous other types of protocols exist.

These protocols can be provided through an application programming interface (API). APIs can be implemented as software programs to enable interactions with other software, much in the same way that a user interface facilitates interaction between humans and computers. APIs are implemented by applications, libraries and operating systems to determine the vocabulary and calling conventions the programmer should employ to use their services.

Continuing with FIG. 1, the UC server 104 can then provide the mobile information to a PBX 106 where the information is processed and rerouted to an associated desktop device 108. The PBX 106 can be an automated telephone switching system that enables users within an organization to place calls to each other without going through the public telephone network. In typical embodiments, the users can also place calls to outside numbers. Those skilled in the relevant art will appreciate that there are numerous types of PBXs 106 that have been developed and the present application is not limited to any particular embodiment.

The PBX 106 can communicate to the UC server 104 through a computer telephony integrated (CTI) interface. The CTI interface is a computer-telephone integration that allows interactions between telephones and computers. These channels can handle email, web features, faxes, etc. The CTI interface can allow computer applications to answer incoming calls, provide database information onscreen, route and reroute calls, dial and speed-dial outgoing calls from a computer resident database, and identify incoming calls and transfer them to predetermined destinations.

Continuing with FIG. 1, the PBX 106 can be coupled to a desktop device 108. The desktop device 108 can be, but is not limited to, a desktop client, soft-phone, or operator console. The mobile information provided by the mobile device 102 can be displayed on the desktop device 108, which is typically PBX provisioned. Often, the desktop devices 108 can include a screen or some other indicator for displaying the mobile information. For example, the desktop device 108 can include light emitting diodes (LEDs) for message waiting indications. The LEDs can be pattern coded or color coded to indicate the type of mobile event. The PBX desktop device 108 can also include a display capable of providing graphics such that a user's multimedia messaging service message could be displayed. The PBX desktop device 108 can also include audible tones for communicating the mobile information. SMS messages can be displayed in the best possible manner allowed by the specific display on the desktop device 108. For instance, a single line display can provide for a scrollable message on the display whereas a larger display can show the entire message. In addition, the desktop device 108 can be programmed by an administrator to specify a specific line for the mobile device 102 to indicate the mobile event. One skilled in the relevant art will appreciate that there are numerous types of mechanisms that can be used to display the mobile event and information to the user on the desktop device 108. In one embodiment, when the desktop device 108 notifies the user that mobile information has been received, the user can respond to the mobile event through their desktop device 108.

The system 100 described above can unify a user's mobile events with their PBX provisioned endpoints. As will be shown below, the system 100 described herein can run on the mobile device 102 that can communicate these indications and messages to the PBX 106 either directly or through the UC server 104. Reports can be created by the PBX 106 or UC server 104 that monitors indications and messages coming into users' mobile devices 102.

As described, there are typically three main features for providing users with mobile information on their office PBX endpoint. In one embodiment, an application can reside on the mobile device 102 to watch for and communicate mobile information after receiving mobile events. In another embodiment, mobile information can be communicated by the mobile carrier network. A receiving API on either the PBX 106 or UC server 104 for the mobile device 102 or mobile carrier network can also be provided. The mobile information can then be displayed on the PBX endpoint.

Figure 2:
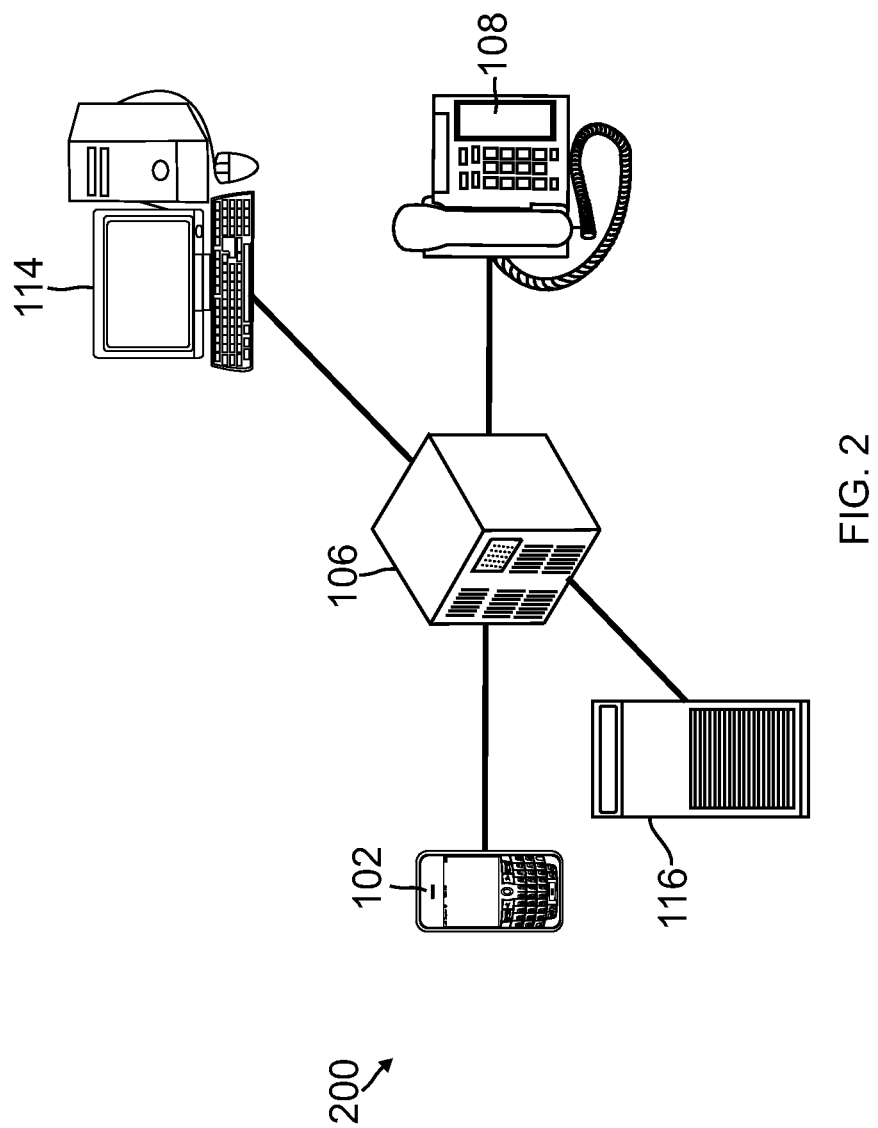
FIG. 2 provides for a typical block diagram whereby communications are provided directly to a private branch exchange in accordance with one aspect of the present application.

In some embodiments, however, a UC server 106 is not used. FIG. 2 provides for a typical block diagram whereby communications are provided directly to a PBX 106 in accordance with one aspect of the present application. As shown, the system 200 can include a mobile device 102, PBX 106, and desktop device 108. In this configuration, the application that does the processing can reside on the mobile device 102. The application can watch for mobile events including missed calls, dialed calls, received calls, incoming VM messages, and incoming SMS and MMS messages. Furthermore, other status information of the mobile device 102 can be monitored, such as busy, ringing, and idle. Those skilled in the relevant art will appreciate that there are numerous mobile events that occur on the mobile device 102. In addition, and in some embodiments, the mobile events can be provided by the mobile carrier networks.

After receiving the mobile events, the application on the mobile device 102 can take the mobile events, including the content of any messages, and communicate them to the PBX 106 through some API provided by the PBX 106. Such interfaces for communication between mobile devices to PBXs are well known in the relevant art. Generally, this can occur through a CTI interface. The mobile information can then be provided to the desktop device 108 and displayed in a manner similar to before.

In the illustrations, which were provided in FIGS. 1 and 2, basic features of the systems 100 and 200 were presented. In some instances, however, the mobile device 102 can be busy often indicating that the mobile device 102 is in use, ringing, has been shut off, or idle. The mobile device can send its status to the PBX 106 so that the PBX 106 can determine that the mobile device 102 is busy. Typically, caller ID applications can also be provided on the desktop device 108 for showing such indications.

In one embodiment, the PBX 106 can avoid sending the user a hunt group or automated call distribution (ACD) hunt group call. Those skilled in the relevant art will appreciate that an ACD hunt group can allow incoming calls to connect automatically to agents or hunt group members. Typically, calls can be queued for the user until they are available.

Often, supervisors or administrators can be assigned to each user. The user's supervisor can listen in on user calls, monitor their queue status, and assist users on ACD calls. Although supervisors can assist users on ACD calls, the supervisors do not normally receive ACD calls unless they are also members. Both supervisors and users can have a queue-status display function button on their set which provides ACD users equipped with digital telephones a periodic update of the number of calls in queue, and the amount of time the oldest queued call has waited.

As a further or entirely separate feature, the desktop device 108, or in some cases the mobile device 102, can provide a direct station selection or busy lamp field key. Known to those skilled in the relevant art, the direct station selection key can allow the user to call another extension with the push of a key. Furthermore, the busy lamp field can allow the observation of another extension to see if that extension is busy or available.

As described in the previous illustrations, communications were typically sent from a mobile device 102 to a desktop device 108 through a PBX 106 and/or UC server 104. In other embodiments, the communicated information, generally in the form of DSS information, can be provided to a number of other devices. For example, and as shown in FIGS. 1 and 2, the information can be provided to a queuing system 116. The queuing system can maintain and manage the information coming in. The information held by the queuing system 116 can then be provided to users through the desktop device 108 or other devices attached thereto.

A personal computer 114, or similar device, can also be attached to the PBX 106. The personal computer 114 can provide for numerous applications that can receive the information from the mobile device 102. For example, one software application can include softphone technology, which typically operates over the Internet. Typically, softphone technologies include other features such as instant messaging, file transferring, and video conferencing.

Soft consoles can also be provided on the personal computer 114 or similar device. These soft consoles are generally used by receptionists receiving and distributing incoming calls. The soft consoles can work in parallel with a physical phone, such as the desktop device 108, to provide operators searchable directories of users. Furthermore, the soft consoles can be used to determine status information and queued calls. While each of the devices described above were directly connected to the PBX 106 through a wireline interface, those devices can also be connected through wireless methods.

As further shown within FIGS. 1 and 2, numerous devices can be connected to either the UC server 104 or the PBX 106 to provide mobile information as well as other types of information, such as status information. In one embodiment, a personal computer 110 can be coupled to the UC server 104 or the PBX 106. The personal computer 110 can include applications such as Microsoft® Network or soft devices described above, i.e., soft phones or consoles. Each of these devices, operating on the personal computer 110 can indicate a user's status as well as provide mobile communications.

In one embodiment, an RFID device 112 can be used to provide location information about the user. In combination with a location application, the location information provided by the RFID device 112 can be used to provide a user's status. Such RFID device 112 can be as simple as an employee's badge along with a detector. Those skilled in the relevant art will appreciate that there can be numerous types of devices that can be used and connected to the UC server 104 or the PBX 106 to provide information.

In typical embodiments of the systems 100 and 200, as shown in FIGS. 1 and 2, the information provided by the devices connected to the UC server 104 or the PBX 106 can be combined so that users, operators, or administrators of the systems 100 and 200 can easily interpret the information. For example, mobile information can be received by the mobile device 102 and status information can be received by other devices such as desksets, softphones, applications, consoles, or a combination thereof. In other embodiments, only the status information from the mobile device 102 can be displayed or used. The operator or application can then use both the individual's mobile status and/or their combined status. The UC server 104 or the PBX 106 can then take that information and evaluate the environment in which the user is in. In some embodiments, software programs can evaluate the information to determine the user's environment.

Those features provided above can allow the mobile phone user to place a call or receive a call on their mobile phone 102, outside of the PBX 106. Furthermore, the PBX 106 can determine whether the user is busy/idle and make decisions based on this status.

Figure 3:
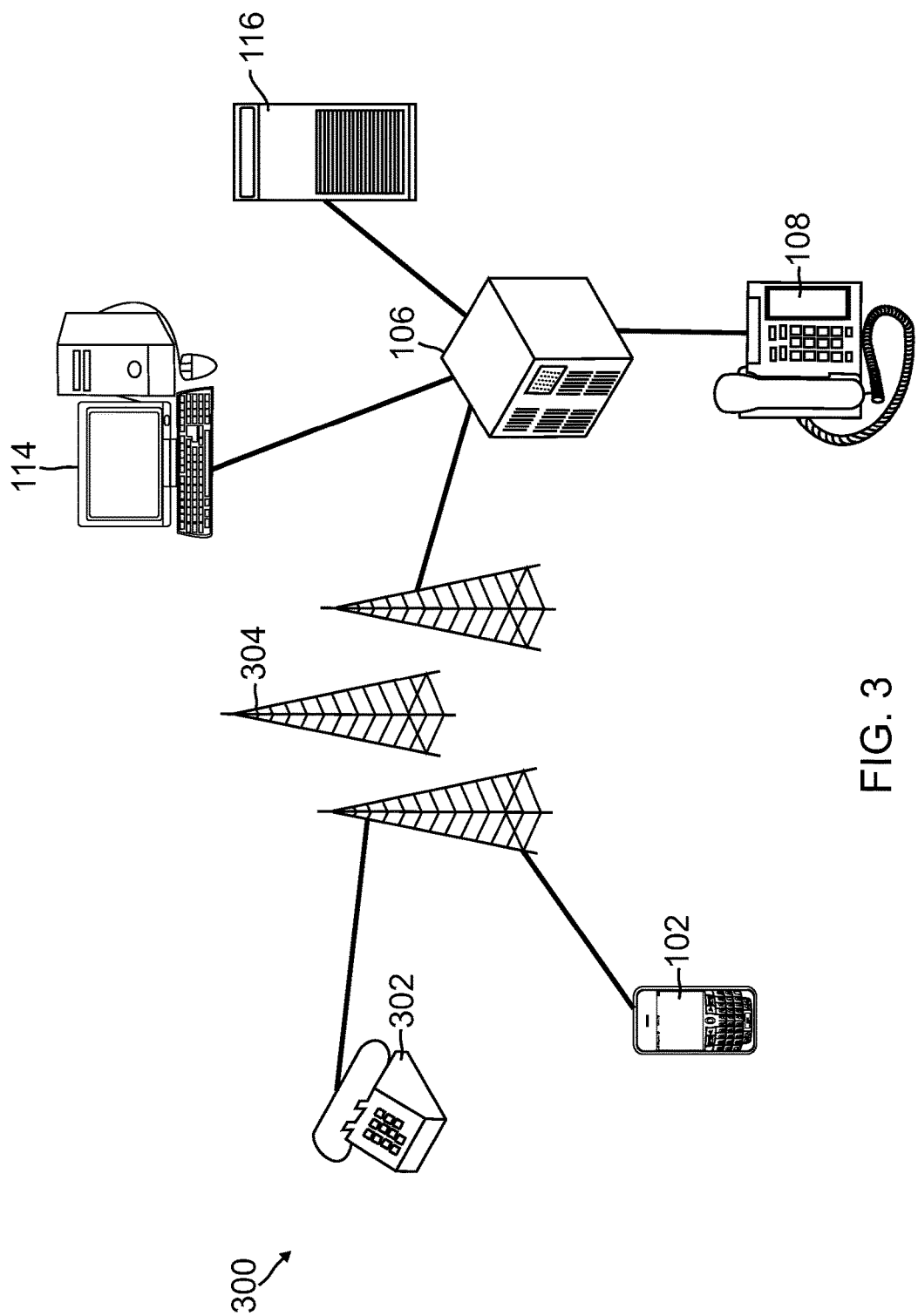
FIG. 3 shows an exemplary carrier network for communicating messages in accordance with one aspect of the present application.

While the application was described previously as running on the mobile device 102, other embodiments of the present application can run on a provider or carrier network and interface with the PBX 106 or UC server 104. FIG. 3 shows an exemplary carrier network 304 for communicating messages in accordance with one aspect of the present application. The system 300 can include a mobile device 102, PBX 106, and a desktop device 108. In addition thereto, the system 300 can include a plain old telephone service (POTS) 302, and a carrier network 304. The carrier network 304 can provide data communications between points in a state or in one or more countries. The carrier network 304 can also provide services for mobile device 102 subscribers as well as POTS 302.

In another embodiment, a central/public office (CO) switch can be used. The CO can stand between the individual stations, the mobile device 102 and the POTS 302, and the PBX 106 as shown. The CO can provide electrical and signaling isolation between the PBX 106 and the individual stations. Because of this, the communication standards between the PBX 106 and the CO and those between the individual stations and the PBX 106 do not necessarily have to be identical. Typically, it is the PBX 106 that performs the "translation" between them. The communication protocols between the CO and the PBX 106 can use open standards. On the other hand, the individual stations to the PBX 106 communication protocols historically have been proprietary protocols.

Through the CO, more than one cell phone or IP phone, each having different service providers, can exchange in-use state, SMS, incoming calls, etc. It should also be noted that the mobile phone 102 can communicate with both the work PBX 106 and the home CO or any combination thereof.

The mobile device 102 can communicate with the UC server 104 or the PBX 106 through a CTI interface. Similar to before, the CTI interface can be a computer-telephone integration that allows interactions between telephones and computers. These channels can handle email, web features, faxes, etc. The CTI interface can allow computer applications to answer incoming calls, provide database information on-screen, route and reroute calls, dial and speed-dial outgoing calls from a computer resident database, and identify incoming consumer calls and transfer them to predetermined destinations.

The PBX 106 can thereafter control the user's desktop device 108 or other similar device, as presented above, and display the mobile information received from the mobile device 102. In addition thereto, and presented above, the desktop device 108 or similar device can provide other information received from devices connected to the UC server 104 or PBX 106. In the embodiment described in FIG. 3, each of the end devices, such as a cell phone, home phone, SIP device, etc., can use separate providers. Using the methods described each of the devices could communicate its events and state to each of the other devices in the deployment. For the devices not connected directly to the PBX 106, the application could be responsible for the pushing of events, displays, etc. and understanding the capabilities of those devices (i.e., displays, SMS, etc).

Figure 4:
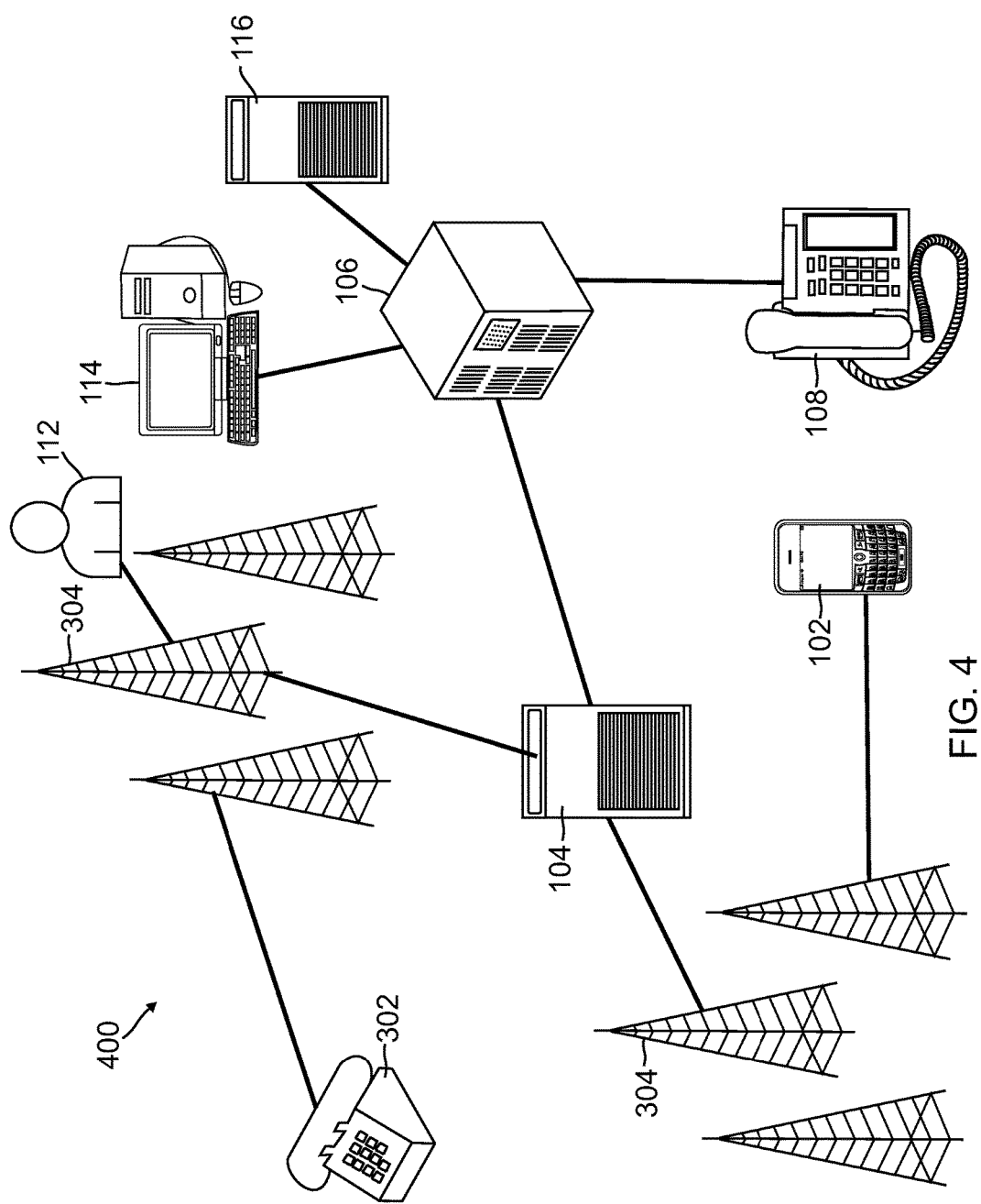
FIG. 4 illustrates a unified communications server within carrier networks in accordance with one aspect of the present application.

Typically, however, each device has its own separate provider. FIG. 4 illustrates a UC server 104 within carrier networks 304 in accordance with one aspect of the present application. As shown before, the carrier networks 304 can be exchanged with COs. For devices hanging off of separate providers, an intermediate UC Server 104 or PBX 106 can be used to exchange data between the separate applications.

Previously described, a PBX 106 or UC server 104 was used to receive mobile information from the mobile device 102 so that the mobile information could be displayed down to the PBX endpoints. In the case of a "middle" server such as the UC server 104 receiving the message, the information can then be relayed to the PBX 106 for displaying to the endpoints. At this stage in the communication, the PBX 106 or UC server 104, in accordance with some embodiments, can store the mobile information or keep statistics for future reporting or reference.

For purposes of illustration, such statistics can include the number of received calls from the mobile device 102. The statistics can also reflect the number of calls directly made into the mobile phone 102 and those that are forwarded to the desktop device 108. Furthermore, the statistics can track those calls made from business numbers and/or from personal numbers. Statistics can also be kept on the number of received and answered calls. One skilled in the relevant art will appreciate that numerous types of statistics can be kept by the PBX 106 or UC server 104.

It is common for mobile devices 102 to place calls through a PBX 106 and thus communicate the status of the user to other users on the system. What is not common is the ability using the same methods described above to push a user's mobile call status (busy/ringing/idle) for calls that were received directly to the mobile device 102 or from the mobile device 102 and not sent through any intermediate server. Other users on the PBX 106 or UC server 104 attached to the PBX 106 can then monitor the user's call status.

As will be shown below, a scheduler can be used to decide whether to forward or push the mobile information to the desktop device 108. The scheduler can tie into a user's calendar or other similar application to indicate periods of time to push the events and statuses of the users of the mobile devices 102. In addition, the scheduler can indicate periods of time when not to push them. The scheduler can also be tied to a user's UC status or presence information. The presence information can include, but is not limited to, "In The Office", "At Lunch", etc. In one scenario, a user's status can have settings indicating if such pushing should occur. Through the use of these calendars or other scheduling methods, the user can provide filters or "black-out" periods in which events are not pushed to the PBX 106 or other devices in the deployment. In the alternative, the PBX 106 can determine whether or not to push the events to the desktop.

Figure 5A:
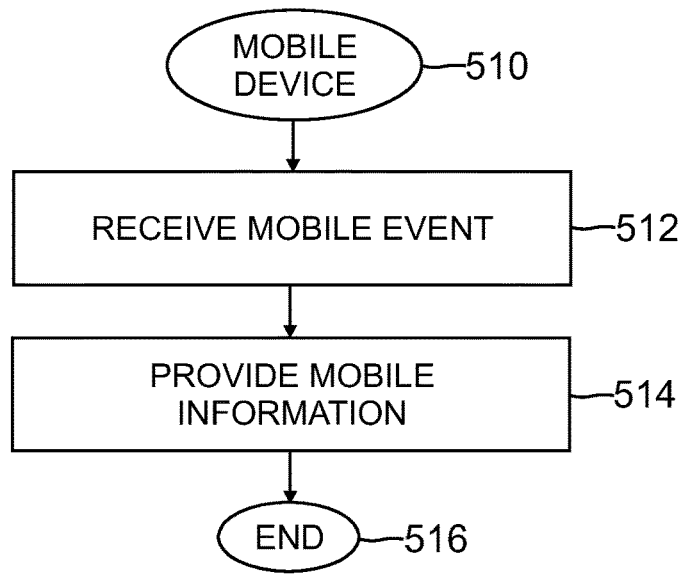
FIG. 5A is a flow chart illustrating routines performed by a mobile device in accordance with one aspect of the present application.

With reference now to FIG. 5A, a flow chart illustrating routines performed by a mobile device 102 in accordance with one aspect of the present application is presented. The routines can begin at block 510. At block 512, the mobile device 102 can receive a mobile event. Typically, mobile events can include received instant messages which are usually a form of chatting. In addition, the mobile event can include an MMS, SMS, fax, email, voicemail, etc. Still yet, the mobile event can include presence information or video conferencing. The mobile event can include unified messaging. Those skilled in the relevant art will appreciate that there are numerous types of mobile communications and those described above in no way necessarily limit the present application.

Using the mobile event, the mobile device 102 can generate mobile information. The mobile information can be the mobile event provided through an API. At block 514, the mobile information is provided to either the PBX 106 directly or through the UC server 104. The routines can end at block 516.

Figure 5B:
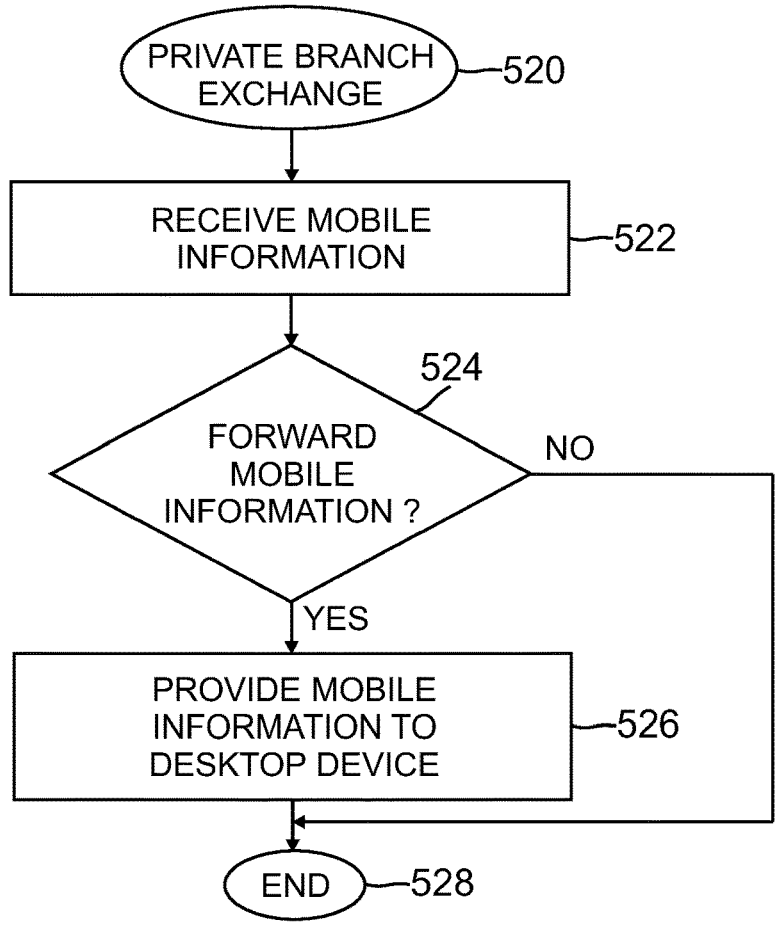
FIG. 5B is a flow chart illustrating routines performed by a private branch exchange in accordance with one aspect of the present application.

While the mobile information can be provided to the UC server 104, eventually the mobile information is provided to the PBX 106. FIG. 5B is a flow chart illustrating routines performed by a PBX 106 in accordance with one aspect of the present application. One skilled in the relevant art will appreciate that these routines can be performed by the UC server 104 as well. The routines can begin at block 520. At block 522, the PBX 106 can receive the mobile information from the mobile device 102. As described above, SOAP can be used.

At determination block 524, the PBX 106 can decide whether to forward the information to the desktop device 108. In one embodiment, this function can be performed through a scheduler. The scheduler can determine what the user's schedule is and decide whether to forward the mobile information. For purposes of illustration, the scheduler can determine that the user is in a meeting and information should not be forwarded. The scheduler can receive information from the mobile device 102. Alternatively, the scheduler can be stored on the mobile device 102 itself. In other embodiments, the scheduler can operate on the UC server 104 or the PBX 106. One skilled in the relevant art will appreciate that there are numerous techniques and methods for determining whether to forward the mobile information, which can take a place on the mobile device 102, UC server 104, PBX 106, desktop device 108, or a combination thereof.

When the information cannot be forwarded, the PBX 106 can end the routines at block 528 or store the messages for later. Otherwise, the PBX 106 mobile information can be provided to a desktop device at block 226. The routines end at block 528.

FIG. 5C is a flow chart illustrating routines performed by a desktop device 108 in accordance with one aspect of the present application. The routines can begin at block 540. At block 542, the mobile information is received by the desktop device 108.

At determination block 544, the desktop device 108 can decide whether or not to display the information. In more typical embodiments, the UC server 104 or the PBX 106 decides. The desktop device 108 can also use a scheduler. The scheduler can be information uploaded from the mobile device 102, UC server 104, PBX 106, or the desktop device 108 itself. The scheduler can be programmed directly from the desktop device 108. When the information is not displayed at the desktop device, the routines end at block 546 or the information can be stored for later use.

At block 548, the desktop device 108 can display the mobile information. The mobile information can include instant messages, MMS, presence information, video conferencing, voice mail, email, SMS, fax, and unified messaging. At block 546 the routines can end.

In accordance with one aspect of the present application, a computer-implemented method for unifying mobile devices with provisioned endpoints is provided. The method can include receiving mobile information from a mobile device. In addition, the method can include combining the mobile information with status information from at least one secondary device. The method can also include processing a communication for at least one provisioned endpoint using the combined information.

In one embodiment, the at least one secondary device includes a status providing application, desktop set, soft phone, or console. In one embodiment, the combined information indicates available, unavailable, busy, idle, ringing, or offline. In one embodiment, processing the communication can include forwarding the communication to the at least one provisioned endpoint when the communication is a live call and the combined information indicates available. In one embodiment, processing the communication can include sending the communication to voice mail when the communication is a live call and the combined information indicates unavailable.

In one embodiment, processing the communication can include providing the communication to an operator when the combined information indicates busy, idle, ringing, or offline. In one embodiment, processing the communication can include sending the communication to a direct station selection key or a busy lamp field of the at least one provisioned endpoint when the combined information indicates busy, idle, ringing, or offline.

In accordance with another aspect of the present application, a desktop mobile information provider is provided. The desktop mobile information provider can include a database for storing filtering events, at least one processor, and a memory operatively coupled to the processor. The memory can store program instructions, that when executed, causes the processor to perform processes. These processes can include monitoring incoming mobile events from the cellular network. In addition, the processes can include determining whether the mobile events can be provided based on the filtering events stored in the database. The processes can also include forwarding the mobile events dependent on the determination.

In one embodiment, the determination is made by an operator of the desktop mobile information provider. In one embodiment, the determination is made by a software program executed by the processor, the software program making status based decisions. In one embodiment, the filtering events are provided by a scheduler. In one embodiment, the filtering events can include a list of blocked senders. In one embodiment, the filtering events can include a list of blocked senders.

In accordance with yet another aspect of the present application, a system is provided. The system can include a mobile carrier network for providing a mobile event. In addition, the system can include a private branch exchange for receiving the mobile event, wherein the private branch exchange routes the mobile event dependent on user status information. The system can also include an endpoint receiving the mobile event when the mobile event is routed from the private branch exchange.

In one embodiment, the system can further include a mobile device coupled to the mobile carrier network, the mobile event originating from the mobile device. In one embodiment, the mobile event can be a missed call, a dialed call, a received call, a voice message, a short message service, and a multimedia messaging service. In one embodiment, the system can further include a unified communications server, the unified communications server receiving the mobile event before the private branch exchange.

In one embodiment, the endpoint can display the mobile event using text, light emitting diodes, audible tones, or graphics. In one embodiment, the endpoint can be a desktop client, soft phone, or operator console. In one embodiment, the system can further include user devices for monitoring the mobile event.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system comprising:
a mobile carrier network for providing a mobile event;
a mobile device coupled to said mobile carrier network, said mobile device configured to receive said mobile event, process said mobile event to generate mobile information, and forward said mobile information;
a private branch exchange configured to receive said mobile information and to route said mobile information to an endpoint provisioned on said private branch exchange; and
said endpoint configured to receive and display said mobile information when said private branch exchange routes said mobile information, wherein said endpoint comprises a plurality of light emitting diodes patterned or color coded to indicate a type of mobile event received at said endpoint.

2. A system comprising:
a mobile device configured to monitor for a mobile event, process said mobile event to generate mobile information for said mobile event, and forward said mobile information;
a private branch exchange configured to receive said mobile information and to route said mobile information to an endpoint provisioned on said private branch exchange dependent on user status information; and
said endpoint configured to receive and display said mobile information when said private branch exchange routes said mobile information, wherein said mobile event is selected from the group consisting of a missed call, a dialed call, a received call, a voice message, a short message service, and a multimedia messaging service, wherein said endpoint comprises a plurality of light emitting diodes patterned or color coded to indicate a type of mobile event received at said endpoint.

3. The system of claim 1, further comprising a unified communications server configured to receive said mobile information forwarded from said mobile device and to transmit said mobile information to said private branch exchange.

4. The system of claim 1, wherein said endpoint is configured to display said mobile information using text, light emitting diodes, audible tones, or graphics.

5. The system of claim 1, wherein said endpoint is selected from the group consisting of a desktop client, a soft phone, and an operator console.

6. The system of claim 2, further comprising a unified communications server configured to receive said mobile event forwarded from said mobile device and to transmit said mobile information to said private branch exchange.

7. The system of claim 2, wherein said endpoint is configured to display said mobile information using text, light emitting diodes, audible tones, or graphics.

8. The system of claim 2, wherein said endpoint is selected from the group consisting of a desktop client, a soft phone, and an operator console.

9. The system of claim 3, wherein the mobile device is configured to forward said mobile information to said unified communications server using a simple object access protocol.

10. The system of claim 3, wherein said unified communications server communicates comprises a computer telephony integrated circuit interface and wherein said unified communications server is configured to transmit said mobile information to said private branch exchange through said computer telephony integrated circuit interface.

11. The system of claim 6, the mobile device is configured to forward said mobile information to said unified communications server using a simple object access protocol.

12. The system of claim 6, wherein said unified communications server communicates comprises a computer telephony integrated circuit interface and wherein said unified communications server is configured to transmit said mobile information to said private branch exchange through said computer telephony integrated circuit interface.

13. The system of claim 1, wherein said mobile information comprises status information for said mobile device.

14. The system of claim 2, wherein said mobile information comprises status information for said mobile device.

* * * * *